*Thomas A. Edison.*
*Impt. in Printing Telegraphs.*

No. 123,006.

Patented Jan. 23, 1872.

Witnesses
Chas H Smith
Harold Serrell

Thomas A. Edison
Lemuel W. Serrell
atty.

123,006

UNITED STATES PATENT OFFICE.

THOMAS A. EDISON, OF NEWARK, NEW JERSEY, ASSIGNOR TO "THE GOLD AND STOCK TELEGRAPH COMPANY," OF NEW YORK CITY.

IMPROVEMENT IN PRINTING-TELEGRAPHS.

Specification forming part of Letters Patent No. 123,006, dated January 23, 1872.

*To all whom it may concern:*

Be it known that I, THOMAS A. EDISON, of Newark, in the county of Essex and State of New Jersey, have invented and made an Improvement in Printing-Telegraphs; and the following is declared to be a correct description of the same.

In Letters Patent No. 113,034 a printing-telegraph is shown with a shifting pad that takes an impression from one of two type-wheels upon a shaft rotated by a ratchet and lever. My present invention is a modification of and improvement upon the said invention, and relates to devices for moving the type-wheel upon the shaft and thereby bringing one wheel into position for printing and throwing the other one out of action.

Figure 1:
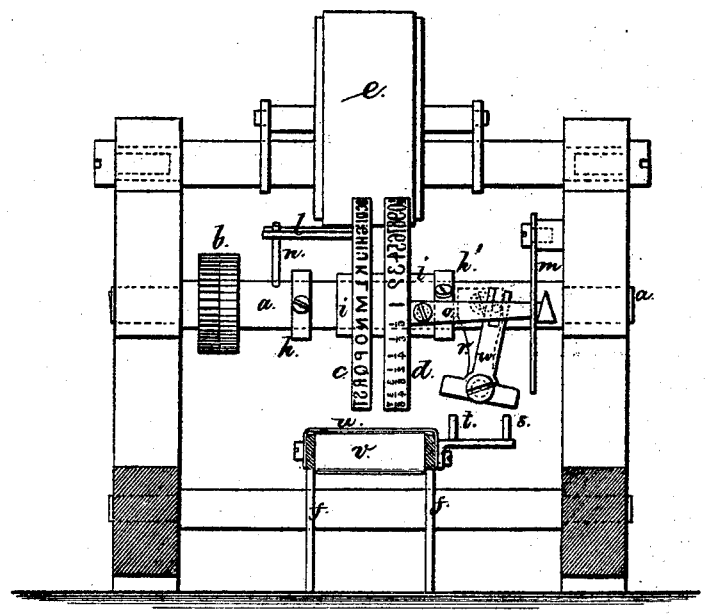
Figure 2:
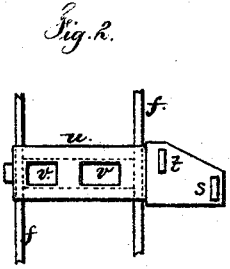
Figure 3:
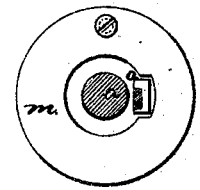

In the drawing, Figure 1 is an elevation of the said machine. Fig. 2 is a plan of the shield for the impression-pad, and Fig. 3 is the stationary guard-ring to prevent the type-wheels moving except at a given point.

The type-wheel shaft $a$ is actuated by pawls, a lever, armature, and magnet, not shown in the drawing, but which may be of any desired or known character, the pawls acting upon the ratchet-wheel $b$. The type-wheels $c\,d$ are inked by the drum $e$, as usual, and the impression-lever $f$ is operated by a magnet in the usual manner. The type-wheels $c\,d$ are attached upon a sleeve, $i$, that slides freely upon the shaft $a$, and the extent of motion is determined by the collars $h\,h$ or other stop, and there is either a feather or polygonal shaft to insure the rotation of the type-wheels with the shaft, or else the projecting rods $l$ are employed, passing at opposite sides of the arm $n$ projecting from the shaft. I prefer this last-named device, as most free from friction. The arm $o$ projects from the sleeve $i$, and has a V-cam at the end running at either one side or the other of the stationary ring $m$, and hence holding the wheels with the sleeve in contact with either the stop $h$ or $h'$; but in this ring $m$ is a notch that allows the V-cam to pass at the point where the type-wheel can be shifted. An arm, $r$, attached to the shaft $a$ carries a T-lever, $w$, one arm of which is connected by a slot and pin with the arm $o$; the other arms are in the path of the finger $s$ and $t$ upon the printing lever $f$. A shield, $u$, covers the impression-pad $v$, but has openings through which the impression can be made. If the type-wheel is turned so that the lever $w$ is stopped over the finger $s$ and then the impression-lever moved there will be no impression, there being a blank in the type-wheel at that point, and the finger will act upon the lever $w$ and shift the type-wheel so as to bring the other type-wheel into position over the opening in the shield, the shield preventing an impression from the other type-wheel. The finger $t$ acts in a similar manner when brought in contact with the lever $w$ to shift the type-wheels to the position shown in the drawing. The portion of the shield between the openings $v\,v$ coming beneath the type-wheel that is not in use prevents an impression therefrom.

I claim as my invention—

1. Two type-wheels fitted to slide endwise of their shaft, in combination with mechanism substantially as specified, to give such end movement to the said type-wheels, and a shield to prevent an impression from more than one of the type-wheels, substantially as set forth.

2. The lever $w$ connected with the type-wheel shaft and type-wheels, in combination with the fingers that are moved by the impression-lever, substantially as set forth.

3. The stationary notched ring $m$, in combination with the type-wheels $c\,d$ fitted to slide endwise of the shaft $a$, substantially as set forth.

Signed by me this 26th day of July, A. D. 1871.

T. A. EDISON.

Witnesses:
CHAS. H. SMITH,
GEO. T. PINCKNEY.